(12) United States Patent
O'Connor et al.

(10) Patent No.: US 10,516,706 B2
(45) Date of Patent: Dec. 24, 2019

(54) SYSTEMS AND METHODS FOR PROVIDING AUTOMATED PROGRESS UPDATES IN A CONTACT CENTER

(71) Applicant: Avaya Inc., Basking Ridge, NJ (US)

(72) Inventors: Neil O'Connor, Athenry (IE); John H. Yoakum, Cary, NC (US); Paul D'Arcy, Clarinbridge (IE)

(73) Assignee: Avaya Inc., Basking Ridge, NJ (US)

( * ) Notice: Subject to any disclaimer, the term of this patent is extended or adjusted under 35 U.S.C. 154(b) by 0 days.

(21) Appl. No.: 15/679,575

(22) Filed: Aug. 17, 2017

(65) Prior Publication Data

US 2019/0058744 A1 Feb. 21, 2019

(51) Int. Cl.
*H04M 3/00* (2006.01)
*H04L 29/06* (2006.01)
*H04L 29/08* (2006.01)
*H04M 3/51* (2006.01)
*H04M 3/523* (2006.01)
(Continued)

(52) U.S. Cl.
CPC .......... *H04L 65/4007* (2013.01); *H04L 51/24* (2013.01); *H04L 65/104* (2013.01); *H04L 65/1006* (2013.01); *H04L 65/1043* (2013.01); *H04L 65/1053* (2013.01); *H04L 65/608* (2013.01); *H04L 67/24* (2013.01); *H04M 3/42365* (2013.01); *H04M 3/42382* (2013.01); *H04M 3/5141* (2013.01); *H04M 3/5166* (2013.01); *H04M 3/5175* (2013.01); *H04M 3/5191* (2013.01); *H04M 3/523* (2013.01); *H04M 7/0036* (2013.01); *H04L 51/04* (2013.01); *H04L 51/10* (2013.01); *H04L 51/36* (2013.01); *H04M 2203/651* (2013.01)

(58) Field of Classification Search
CPC ............. H04M 3/5191; H04M 3/5183; H04M 3/5166; H04M 3/5175; H04M 3/523
USPC ........................... 379/265.01–265.02, 265.09
See application file for complete search history.

(56) References Cited

U.S. PATENT DOCUMENTS 6,631,412 B1 10/2003 Glasser et al.
6,819,759 B1 * 11/2004 Khuc ................ H04M 3/42017
379/265.02
(Continued)

OTHER PUBLICATIONS

Haile, Feben; Final Office Action; U.S. Appl. No. 15/337,479; dated Jul. 26, 2018; United States Patent and Trademark Office; Alexandria, Virginia.
(Continued)

*Primary Examiner* — Rasha S Al Aubaidi
(74) *Attorney, Agent, or Firm* — Stevens & Showalter, L.L.P.

(57) ABSTRACT

Providing automated progress updates in a contact center including detecting an activity by a resource of the contact center related to a customer interaction occurring via a customer communications channel between the resource and a customer. The activity comprises an interaction between the resource and one or more additional resources associated with the contact center occurring via a second communications channel. In response to detecting the activity by the resource, a notification comprising a progress update related to the customer interaction is automatically generated. The notification is transmitted, via the customer communications channel, to a customer device associated with the customer interaction.

20 Claims, 7 Drawing Sheets

(51) Int. Cl.
*H04M 3/42* (2006.01)
*H04M 7/00* (2006.01)
*H04L 12/58* (2006.01)

(56) References Cited

U.S. PATENT DOCUMENTS

| | | |
|---|---|---|
| 8,234,141 B1 | 7/2012 | Flockhart et al. |
| 8,634,543 B2 | 1/2014 | Flockhart et al. |
| 9,178,999 B1 | 11/2015 | Hegde et al. |
| 9,680,995 B2 | 6/2017 | Tendick et al. |
| 2003/0174829 A1 | 9/2003 | Dezonno et al. |
| 2010/0325216 A1 | 12/2010 | Singh et al. |
| 2014/0095633 A1 | 4/2014 | Yoakum |
| 2014/0282083 A1 | 9/2014 | Gaetano, Jr. et al. |
| 2015/0039747 A1 | 2/2015 | Meloche |
| 2015/0378561 A1* | 12/2015 | Ollinger ............ G06Q 10/06398 707/769 |
| 2016/0021247 A1* | 1/2016 | Marimuthu ......... H04M 3/4286 455/414.1 |
| 2016/0212265 A1 | 7/2016 | Philonenko et al. |
| 2016/0219149 A1 | 7/2016 | Krishnan et al. |
| 2017/0078486 A1 | 3/2017 | Koga |
| 2017/0255680 A1* | 9/2017 | Malatesha ......... G06F 17/30554 |
| 2018/0012232 A1 | 1/2018 | Sehrawat et al. |
| 2018/0103149 A1 | 4/2018 | Skiba et al. |
| 2018/0124238 A1 | 5/2018 | Shah et al. |

OTHER PUBLICATIONS

Haile, Feben; Non-Final Office Action; U.S. Appl. No. 15/337,479; dated Feb. 2, 2018; United States Patent and Trademark Office; Alexandria, Virginia.

Haile, Feben; Non-Final Office Action; U.S. Appl. No. 15/337,479; dated Oct. 2, 2018; United States Patent and Trademark Office; Alexandria, Virginia.

Haile, Feben; Non-Final Office Action; U.S. Appl. No. 15/337,479; dated Mar. 21, 2019; United States Patent and Trademark Office; Alexandria, Virginia.

Haile, Feben; Final Office Action; U.S. Appl. No. 15/337,479; dated Jul. 29, 2019; United States Patent and Trademark Office; Alexandria, VA.

U.S. Appl. No. 16/599,185, entitled "Systems and Methods for Providing Automated Progress Updates in a Contact Center", filed Oct. 11, 2019 with inventors Neil O'Connor et al.

* cited by examiner

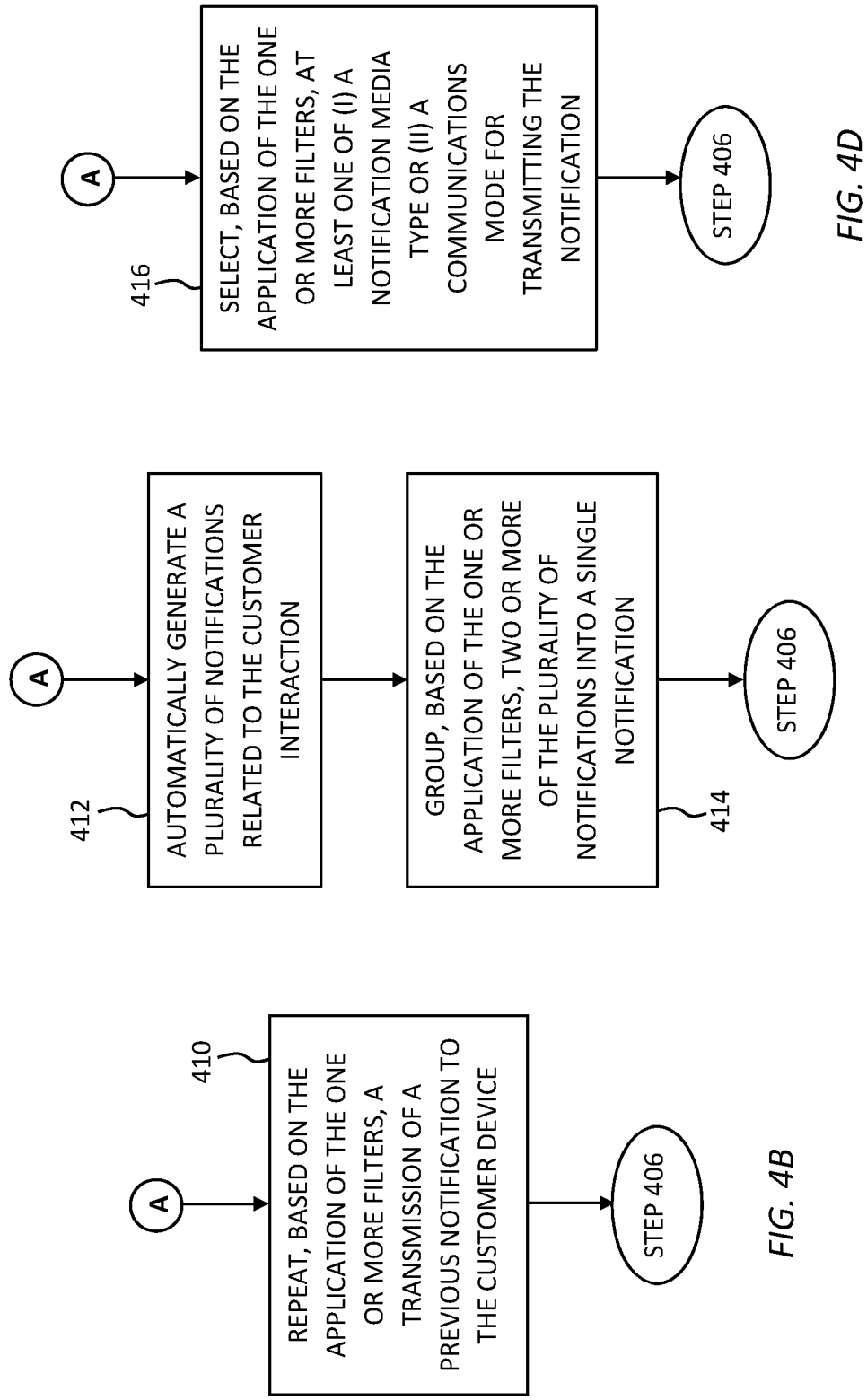

SYSTEMS AND METHODS FOR PROVIDING AUTOMATED PROGRESS UPDATES IN A CONTACT CENTER

BACKGROUND

The present disclosure relates generally to operation of a contact center, and, more particularly, to automatic generation of notifications comprising progress updates.

When a customer is engaged in an interaction with a contact center resource, the resource typically must provide the customer with manual updates regarding the current point of progress and any actions taken by the resource related to handling of the customer's query. For example, a resource engaged in a phone call with a customer may verbally inform the customer that "I am just bringing up your account information now," "I will speak to a colleague and come back to you," "I am checking the terms of your policy," and the like. In a text-based interaction such as web chat or email, the resource may inform the customer of the status of his or her query by manually typing an update or by manually selecting a suitable, preconfigured phrase.

Some products allow the participants of web chat or other text-based interactions to see that one party is typing, e.g., by displaying a text notification such as "Agent A is typing" to the customer. However, such products are often limited only to notifying participants when one party is typing and do not provide information about any other actions being performed by the party. The customer must typically wait until the resource completes and transmits the message to receive the update. In addition, these products provide no solutions for updating customers involved in voice-based interactions. This lack of meaningful feedback often leads to customer frustration and a general perception by customers that their query is not progressing quickly enough or at all. These problems may lead to lowered customer satisfaction, particularly in today's multichannel contact centers where customers expect a similar experience and level of service across a variety of communications channels.

BRIEF SUMMARY

One aspect of the present disclosure relates to a method for providing automated progress updates. This method includes detecting, by a processor of a contact center, an activity by a resource of the contact center related to a customer interaction occurring via a customer communications channel between the resource and a customer. The activity by the resource comprises an interaction between the resource and one or more additional resources associated with the contact center occurring via a second communications channel. The method further includes, in response to detecting the activity by the resource, automatically generating, by the processor, a notification comprising a progress update related to the customer interaction; and transmitting, by the processor, via the customer communications channel, the notification to a customer device associated with the customer interaction.

Another aspect of the present disclosure relates to a system for providing automated progress updates. This system includes a memory device, storing executable instructions, and a processor in communication with the memory device. In particular, the processor, when executing the executable instructions, detects an activity by a resource of the contact center related to a customer interaction occurring via a customer communications channel between the resource and a customer. The activity by the resource comprises an interaction between the resource and one or more additional resources associated with the contact center occurring via a second communications channel. The processor, when executing the executable instructions, in response to detecting the activity by the resource, automatically generates a notification comprising a progress update related to the customer interaction; and transmits, via the customer communications channel, the notification to a customer device associated with the customer interaction.

A further aspect of the present disclosure relates to another method for providing automated progress updates. The method includes detecting, by a processor of a contact center, a first activity by a resource of the contact center related to a first voice interaction between the resource and a first customer; and detecting, by the processor, a second activity by the resource related to a second voice interaction between the resource and a second customer. The first and second voice interactions are handled simultaneously by the resource and are occurring via a customer communications channel between the resource and the first and second customers. The first and second activities each comprise an interaction between the resource and one or more additional resources associated with the contact center occurring via a second communications channel. The method further includes, in response to detecting the first activity by the resource, automatically generating, by the processor, a first notification comprising a first progress update related to the first voice interaction; and, in response to detecting the second activity by the resource, automatically generating, by the processor, a second notification comprising a second progress update related to the second voice interaction. The first and second progress updates each comprise a respective audible progress update. The method further includes transmitting, by the processor, via the customer communications channel, the first notification to a first customer device associated with the first voice interaction; and transmitting, by the processor, via the customer communications channel, the second notification to a second customer device associated with the second voice interaction.

BRIEF DESCRIPTION OF THE DRAWINGS

So the manner in which the above recited features of the present disclosure may be understood in detail, a more particular description of embodiments of the present disclosure, briefly summarized above, may be had by reference to embodiments, which are illustrated in the appended drawings. It is to be noted, however, the appended drawings illustrate only typical embodiments encompassed within the scope of the present disclosure, and, therefore, are not to be considered limiting, for the present disclosure may admit to other equally effective embodiments, wherein:

FIGS. 4A-4D are flowcharts of exemplary methods for providing automated progress updates in accordance with one aspect of the present disclosure;

DETAILED DESCRIPTION

Figure 1:
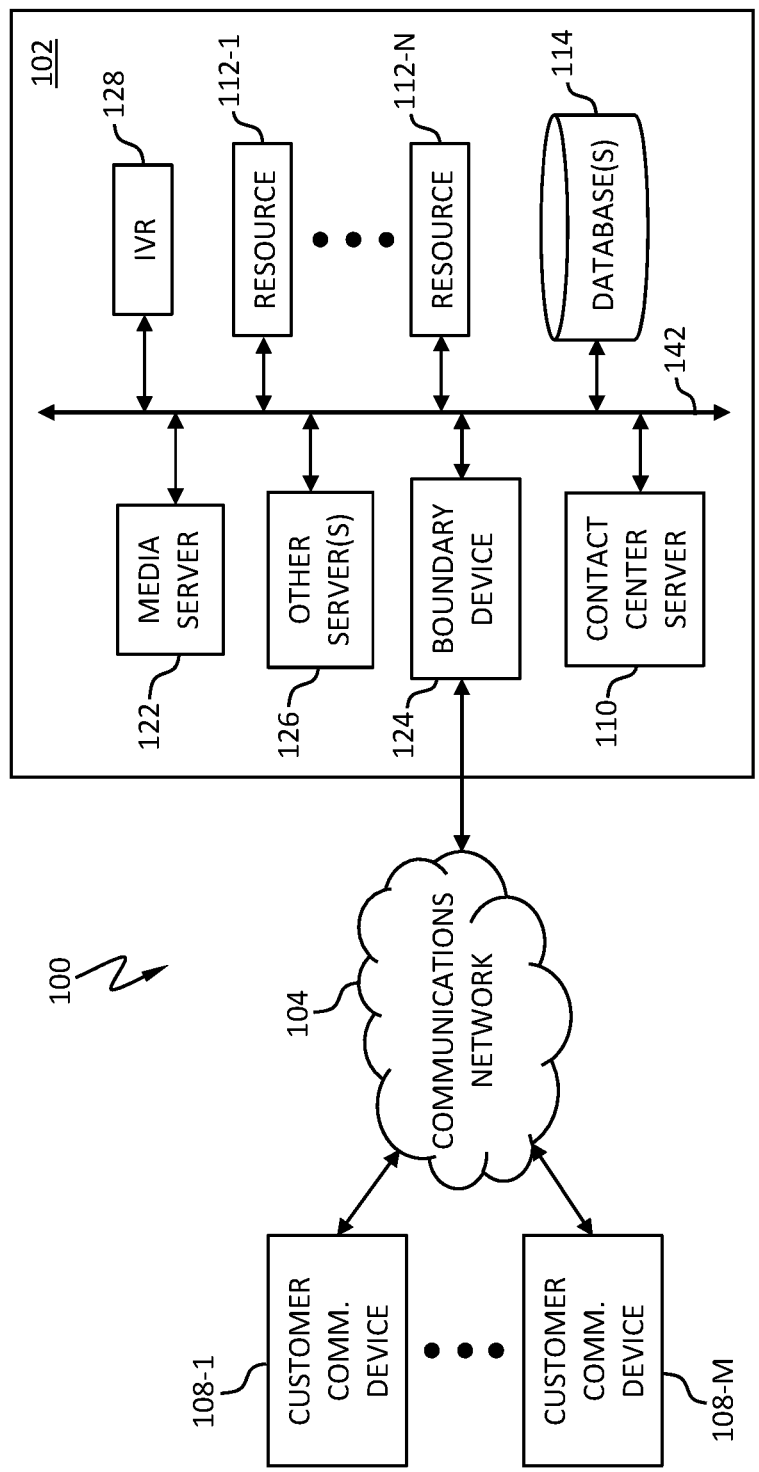
FIG. 1 illustrates a communications system architecture in accordance with principles of the present disclosure.

The present disclosure will be illustrated below in conjunction with an exemplary communications system. Although well suited for use with, e.g., a system having an Automated Call or Contact Distribution (ACD) system or other similar contact processing switch, the present disclosure is not limited to any particular type of communications system switch or configuration of system elements. Those skilled in the art will recognize that the disclosed techniques may be used in any communications application in which it is desirable to provide improved contact processing.

Aspects of the present disclosure will be described in connection with the execution of a multichannel contact center. The term "multichannel" may refer to a contact center having a capability to communicate with a single customer using multiple different channels of communication. A communications channel may correspond to a physical channel (e.g., a data path across a communications network that includes a plurality of nodes and interconnecting wired or wireless communications links), a logical channel (e.g., a protocol-dependent communications modality), and/or combinations thereof. It should also be appreciated that different communications channels may or may not carry different media types. For instance, one communications channel may be capable of carrying first and second media types (e.g., voice and data) and a second communications channel may be capable of carrying only one of those media types (e.g., data). In such an example, the communications channels do not necessarily carry mutually exclusive media types. In another example, one communications channel may carry one media type (e.g., video, which is a combination of image and voice) and another communications channel may carry a different media type (e.g., data). A communications channel may also include data exchanges between different modules, or functionality blocks, of a single application operating on a device, computer, or computer system and/or intra-process or inter-process exchanges of data between different software applications operating on the same device, computer, or computer system.

In the following detailed description, numerous specific details are set forth in order to provide a thorough understanding of embodiments or other examples described herein. In some instances, well-known methods, procedures, components and circuits have not been described in detail, so as to not obscure the following description. Further, the examples disclosed are for illustrative purposes only and should not be construed as limiting of the scope of embodiments of the present disclosure.

The term "a" or "an" entity refers to one or more of that entity. As such, the terms "a" (or "an"), "one or more," and "at least one" may be used interchangeably herein. It is also to be noted that the terms "comprising," "including," and "having" may be used interchangeably.

The term "automatic" and variations thereof, as used herein, refers to any process or operation done without material human input when the process or operation is performed. However, a process or operation may be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The term "computer-readable medium" as used herein refers to any tangible storage and/or transmission medium that participates in storing and/or providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, RAM, PROM, EPROM, FLASH-EPROM, solid state medium like a memory card, any other memory chip or cartridge, a carrier wave as described hereinafter, or any other medium from which a computer may read. A digital file attachment to email or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

As used herein in connection with embodiments of the present disclosure, the term "contact" refers to a communication from a user or a customer. The communication may be by way of any communications medium or mode such as, but not limited to, a telephone call, email, instant message, web chat, and the like. The terms "user" and "customer" denote a party external to the contact center. A user or customer may include, for example, a person having a commercial relationship with the contact center or with a business represented by the contact center.

The terms "determine," "calculate," and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the present disclosure is described in terms of exemplary embodiments, it should be appreciated that those individual aspects of the present disclosure may be separately claimed.

The terms "switch," "server," "contact center server," or "contact center computer server" as used herein should be understood to include a Private Branch Exchange (PBX), an ACD system, an enterprise switch, or other type of telecommunications system switch or server, as well as other types of processor-based communications control devices such as, but not limited to, media servers, computers, adjuncts, and the like. One or more embodiments of the present disclosure may utilize Session Initiation Protocol (SIP) as a communications protocol. SIP is a communications protocol that is known and described in Internet Engineering Task Force (IETF) Request For Comment (RFC) 3261, the content of which is hereby incorporated by reference in its entirety. SIP is an open signaling protocol for establishing many kinds of real-time communications sessions, such as voice, video, and/or instant messaging, and may be used with other IETF protocols to build multimedia architectures including Real-Time Transport Protocol (RTP), Real-Time Streaming Protocol (RTSP), Media Gateway Control Protocol (MEGACO), and the Session Description Protocol (SDP). One or more embodiments of the present disclosure may utilize Web Real-Time Communications (WebRTC). WebRTC represents an ongoing effort to develop industry standards for integrating real-time communications functionality into web clients, such as web browsers or mobile apps or desktop apps, to enable direct interaction with other web clients or apps. This real-time communications functionality is accessible by web or app developers via standard markup tags, such as those provided by version 5 of the Hypertext Markup Language (HTML5), and client-side scripting Application Programming Interfaces (APIs) such as JavaScript APIs. WebRTC provides built-in capabilities for establishing real-time video, audio, and/or data streams in both point-to-point interactive sessions and multi-party interactive sessions. The WebRTC standards continue to be jointly developed by the World Wide Web Consortium and the Internet Engineering Task Force.

FIG. 1 shows an exemplary embodiment of a communications system 100 according to the present disclosure. The communications system 100 may comprise a communications network 104 connecting a contact center 102 to one or more customer communication devices 108-1 to 108-M, where M is an integer, M≥1 (referred to herein collectively as a customer communication device 108). Each customer communication device 108 may be associated with a contact or customer and may comprise, for example, a cellular phone, computer, Personal Digital Assistant (PDA), digital or analog phone, and the like. The communications network 104 may comprise any type of known communications medium or mode or collection of communications media and/or modes and may use any type of protocols to transport messages between endpoints. The communications network 104 may be packet-switched and/or circuit-switched and may include wired and/or wireless technologies.

The contact center 102 may comprise, for example, a boundary device 124, a central contact center server 110, a media server 122, one or more other servers 126, an Interactive Voice Response (IVR) unit or system 128, and a set of one or more data stores or databases 114. The additional servers 126 may include, for example, a voice portal (not shown), a video call server, an email server, and the like. The database(s) 114 may contain contact-related or customer-related information and other information that may enhance the value and efficiency of contact processing, as described herein. Some or all of the components of the contact center 102 may be interconnected by an internal network 142 such as a local area network (LAN) or wide area network (WAN). One or more of the components of the contact center 102 may also be connected via one or more optional communications links (not shown; see FIG. 2) to one or more other components of the contact center 102.

Although several functions are depicted in FIG. 1 as separate servers and/or applications that are co-located with one another, it should be appreciated that this particular configuration of components is not required. For example, some or all of the functions depicted in the contact center 102 may be co-hosted and/or co-resident on a single server and/or processor (e.g. the contact center server 110), and/or two or more of the components of the contact center 102 may be distributed and connected to one another over the communications network 104, in which the communications between these components may be secured with tunneling protocols or a Virtual Private Network (VPN; not shown). In addition, although one central contact center server 110 is depicted in FIG. 1, two or more servers (not shown) may be provided in a single contact center 102 or across multiple separate LANs 142 owned and operated by a single enterprise but separated by the communications network 104. Likewise, the contact center 102 may comprise two or more media servers 122, IVR systems 128, etc. In configurations where the contact center 102 includes two or more of the same component, each one may comprise similar functionality but may be provisioned for providing its features to only a subset of all contact center users.

A contact or customer associated with a customer communication device 108 may utilize the device 108 to generate and transmit a communication, such as a telephone call, a video phone call, an email message, an instant message (IM), a Short Message Service (SMS) message, etc., over the communications network 104, which is received as a contact at the contact center 102. The contact may be received at the boundary device 124, which maintains a secure separation between the communications network 104 and the internal network 142 and facilitates communications between the customer communication device 108 and the contact center 102. The boundary device 124 may include the functionality of one or more of a switch, a computer-telephony integration (CTI) interface, a SIP gateway, a security gateway, a firewall, a router, a session border controller (SBC), or the like. A boundary device 124 comprising a SIP gateway may, for example, connect with one or more SIP trunks from the communications network 104 and split incoming aggregate SIP traffic into individual SIP sessions and aggregate the individual outbound SIP sessions. The boundary device 124 may be implemented as hardware such as via an adjunct processor (as shown) or as a chip in the contact center server 110 (not shown).

For each contact received at the contact center 102, a contact object is instantiated. The contact object may comprise one or more variables, functions, and data structures that represent the contact and may also comprise a number of attributes, which are assigned values based on its corresponding contact. Each contact object is distributed to one or more of a plurality of resources 112-1 to 112-N, wherein N is an integer, N≥1 (referred to collectively herein as a resource 112). Each resource 112 represents a processing resource of the contact center 102 and may comprise automated resources (e.g., processors, servers, or the like), human resources utilizing communication devices (e.g., human agents utilizing a computer, telephone, laptop, etc.), or any other resource known to be used in a contact center 102. In some embodiments, contact objects may be assigned to the IVR system 128, a voice portal (not shown), an automated text-chat engine (not shown), or other automated resource of the contact center 102 for customer service processing prior to or simultaneous with assigning the contact object to a human resource. For example, the voice portal and the IVR system 128 may work together to provide IVR services to the contacts.

Figure 2:
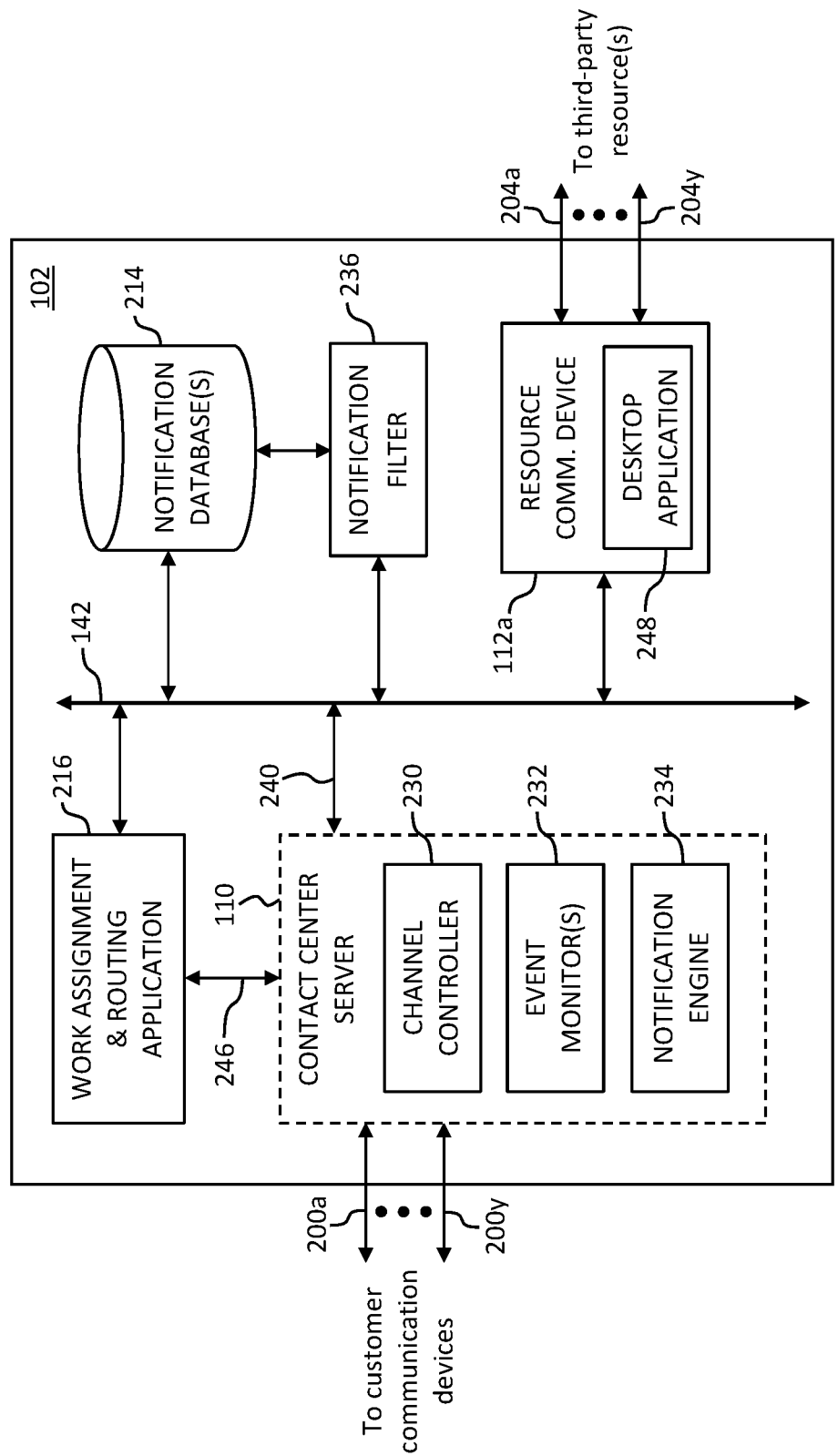
FIG. 2 illustrates aspects of a contact center server in accordance with principles of the present disclosure.

Each of the resources 112 is associated with a resource communication device (not shown; see FIG. 2). The resource communication device may be a packet-switched device such as a computer workstation, an IP hardphone or softphone, a packet-based H.320 video phone and conferencing unit, a packet-based voice messaging and response units, a packet-based traditional computer telephony adjunct, a peer-to-peer based communication device, and/or any other suitable communication device. These packet-switched devices may be SIP compatible. The resource communication device may also comprise a circuit-switched device that corresponds to one of a set of internal extensions and may include, for example, wired and wireless telephones, voice messaging and response units, traditional computer telephony adjuncts, and/or any other suitable communication device. A resource 112 may use an associated resource communication device to receive an incoming contact and to initiate a contact, such as via a callback mechanism, outbound call, etc. In the case of an automated resource, the resource communication device may be software comprising executable instructions that allow the automated resource to send and receive information.

Although some embodiments are discussed with reference to a client-server architecture, it is to be understood that the principles of the present disclosure apply to other network architectures. For example, the present disclosure applies to peer-to-peer networks, such as those envisioned by SIP or WebRTC. In the client-server model or paradigm, network services and the programs used by end users to access the services are described. The client side provides a user with an interface for requesting services from the network, and the server side is responsible for accepting user requests for services and providing the services transparent to the user. By contrast, in the peer-to-peer model or paradigm, each networked host runs both the client and server parts of an application program. Additionally, the disclosure does not require the presence of packet- or circuit-switched networks.

FIG. 2 illustrates some aspects of a contact center 102 in accordance with principles of the present disclosure. The contact center 102 comprises a contact center server 110, a work assignment and routing application 216, an optional notification filter 236, and one or more notification databases 214. The contact center server 110 may comprise a channel controller 230, one or more event monitors 232, and a notification engine 234. The contact center server 110, the work assignment/routing application 216, the notification filter 236, and the notification database(s) 214 may each be connected via one or more communications links to the internal network 142 and/or directly to each other. For example, the contact center server 110 may be connected to the internal network 142 via a communications link 240 and directly to the work assignment/routing application 216 via a communications link 246. In addition, although several functions are depicted in FIG. 2 as residing on the contact center server 110, it should be appreciated that one or more of the functions may reside on one or more separate servers (not shown) and/or one or more of the functions depicted as separate may reside on, for example, the contact center server 110.

The contact center server 110 may include, for example, Avaya Inc.'s Operational Analyst™ (OA) with On-Line Analytical Processing (OLAP) technology and/or a Call Management System (CMS) or other suitable systems that gather contact records and contact-center statistics for use in contact center management. Contact objects may be received by the contact center server 110, and at least one work item may be generated for each contact object. The format of each work item may depend upon the capabilities of the customer communication device 108 and the format of the communication. In particular, work items are logical representations within the contact center 102 of work to be performed in connection with servicing a particular contact received at the contact center 102. Each work item generally comprises at least a request for a resource (not shown; see FIG. 1) of the contact center 102. Contacts may be assigned and routed to resources by the work assignment/routing application 216. Resources may be selected using skill-based assignment, in which resources are assigned to one or more skill groups and contacts are assigned to resources based on a comparison of the resource skill(s) required to service the contact and the skillset(s) of each resource. In an attribute-based contact center, such as a contact center using the Avaya Oceana® Solution, contacts are assigned to a resource based on matches between a plurality of individual attributes of the contact and the resource. Assignment and routing of contacts in queue-based and queueless contact centers are described in more detail in U.S. Pat. Nos. 8,234,141 and 8,634,543, the content of each of which is hereby incorporated herein by reference in its entirety.

With reference to FIGS. 1 and 2, following assignment of an incoming contact to a resource or initiation of a contact by a resource, the customer communication device 108 associated with the contact is connected with a respective resource communication device 112a associated with the resource via one or more communications lines or channels 200a to 200y as described herein (referred to herein collectively as a customer communications channel 200). The customer communications channel 200 may be established over a common network, e.g., the communications network 104 of FIG. 1. The contact center server 110 may comprise a channel controller 230 that is configured to manage the utilization of the various communications channels of the contact center 102, including the customer communications channel 200. The channel controller 230 may, for example, comprise a set of instructions stored in a computer memory that, when executed by a processor, enable the contact center 102 to operate as a multichannel contact center.

Interactions between the customer and the contact center resource may occur via one or more communications channels and may include one or more different communications modes (e.g., email, web chat, voice call, etc.) and/or media types (e.g., voice only, voice and video, etc.). In one example, the customer may be communicating with the resource using two real-time or near real-time communications modes (e.g., a voice or video call and web chat or IM). In another example, the customer may communicate with the resource via one real-time or near real-time communications mode and one non-real-time communications mode (e.g., email, social media posts or messages, etc.). In a further example, the customer may communicate with the resource via two or more different customer communication devices 108. In these examples, each communication between the customer and the resource may be viewed as a separate interaction with one or more separate work items. The channel controller 230 may logically group or associate the interactions so that the work assignment/routing application 216 views the multiple interactions as a single interaction. The channel controller 230 will then route media received via the different channels and/or modes to the same resource communication device 112a, thereby allowing the resource to interact with the customer via all applicable communications channels and/or modes.

The customer may also communicate with the contact center 102 on several occasions on the same day or over a longer period of time, such that the customer interaction may include multiple discrete or chronologically separated communications sessions between the customer and one or more resources of the contact center 102. These interactions may be grouped together to form a customer journey reflecting the customer's overall interaction with the contact center 102. In some examples, the interactions within the customer journey may be grouped by one or more of a communications medium and/or mode, a related topic or subject matter, and the like. Multichannel interactions are described in more detail in U.S. Patent Publication No. 2016/0212265, the content of which is herein incorporated by reference in its entirety.

In some embodiments, the interaction may be a WebRTC communication between the resource and customer. To establish a WebRTC interactive flow (e.g., a real-time video, audio, and/or data exchange), two WebRTC clients may retrieve WebRTC-enabled web applications, such as HTML5/JavaScript web applications, from a WebRTC application server. Through the web applications, the two WebRTC clients then engage in dialogue for initiating a peer connection over which the WebRTC interactive flow will pass. The initiation dialogue may include a media negotiation used to reach an agreement on parameters that define characteristics of the WebRTC interactive flow. Once the initiation dialogue is complete, the WebRTC clients may then establish a direct peer connection with one another, and may begin an exchange of media and/or data packets transporting real-time communications. The peer connection between the WebRTC clients typically employs the Secure Real-time Transport Protocol (SRTP) to transport real-time media flows, and may utilize various other protocols for real-time data interchange. Dedicated mobile or desktop WebRTC enabled apps use similar interaction dialogues and techniques to establish media flows.

Figure 3:
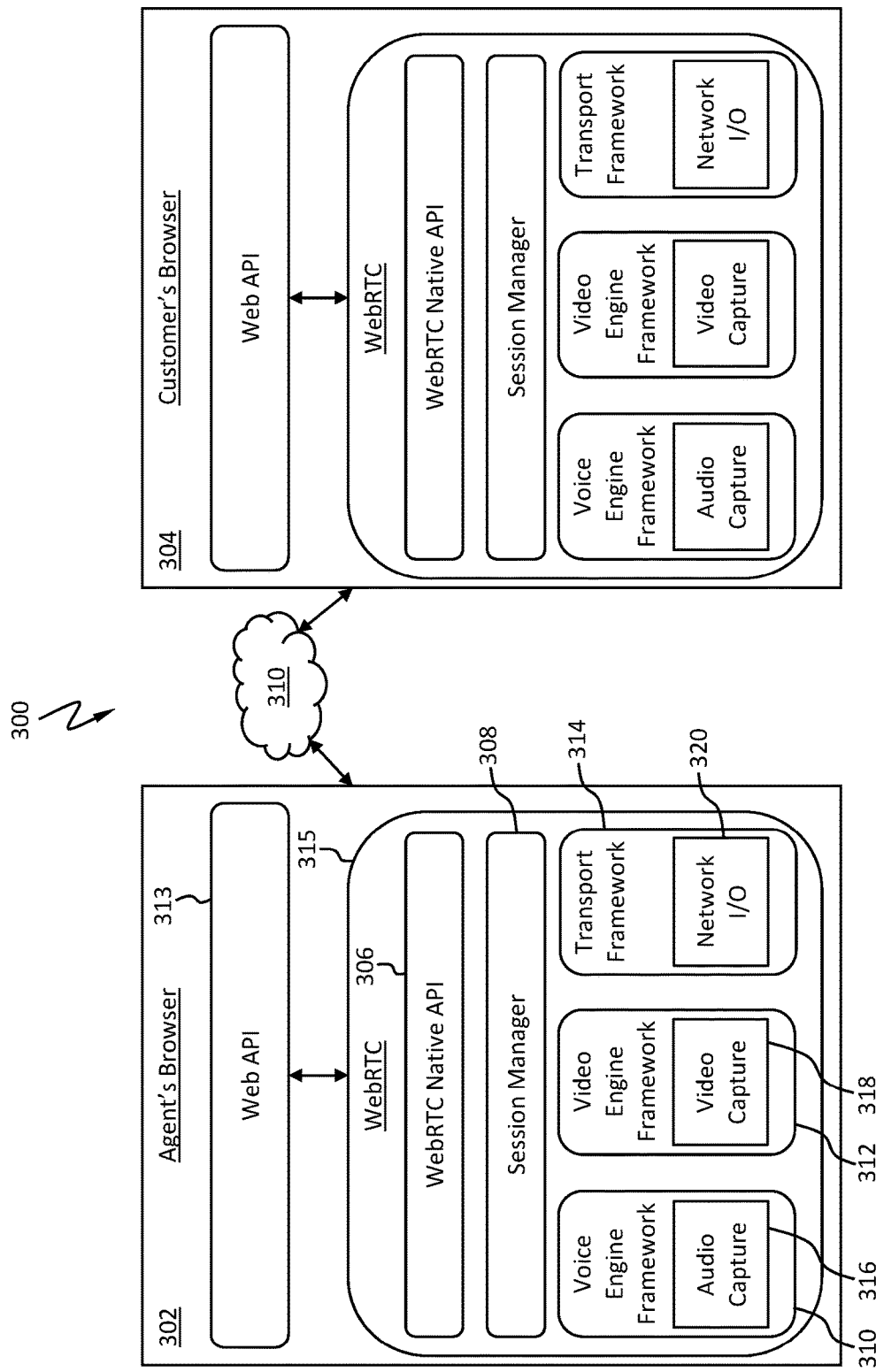
FIG. 3 illustrates a conceptual diagram of a Web Real-Time Communications (WebRTC) interactive session between a resource and a customer in accordance with principles of the present disclosure.

FIG. 3 depicts a simplified architecture 300 that is used to enable a resource 112 of the contact center 102 (see FIG. 1) to communicate with a customer, by using WebRTC technology. As shown, web browser 302 of a resource (hereinafter may be referred to as 'resource's browser' 302) of the contact center 102 is in communication with another web browser 304 of a customer (hereinafter may be referred to as 'customer's browser' 304) via a network 310, which may comprise the communications network 104 of FIG. 1. In an embodiment, the resource's browser 302 and the customer's browser 304 may be any web browser that supports the WebRTC technology. Further, the resource and the customer must have a device that supports WebRTC enabled browsers. Examples of such devices may include, but are not restricted to, a personal computer, a mobile phone, a smartphone, a personal digital assistant (PDA), a tablet computer, a laptop, and the like.

Further, the resource's browser 302 may be enabled to communicate with the customer's browser 304 over the network 310 by a WebRTC layer 315 with the help of a web API 313. Further, the WebRTC layer 315 includes a WebRTC Native API layer 306, which is used for peer connections and helps in implementation of the proposals received from the web API 313. Further, the WebRTC layer 315 includes a session manager layer 308, which is used to enable real time protocols for establishing and managing connections across the network 310.

The WebRTC layer 315 includes three types of frameworks such as a voice engine framework 310, a video engine framework 312, and a transport framework 314. The voice engine framework 310 is used for the audio media chain, from sound card to the network 310. It also helps in cancelling acoustic echo and in reduction of noise. The voice engine framework 310 further includes an optional audio capture API 316 for recording audio communications.

Further, the video engine framework 312 is used for the video media chain, from a camera of the resource's device (not shown; may be the resource communication device 112a of FIG. 2) having the resource's browser 302 to the network 310 and from the network 310 to display screen (not shown) of the resource's device. It also helps in concealing effects of video jitter and packet loss on overall video quality. Moreover, it also removes video noise from images captured by the camera. The video engine framework 312 further includes an optional video capture API 318 for recording video communications.

In addition, the transport framework 314 is used in peer to peer communication and its optional network I/O API 320 may facilitate management of inputs/outputs of the resource or customer over the network 310. This WebRTC architecture 300 enables the resource's browser 302 to communicate with the customer's browser 304. In some embodiments, the customer's browser 304 may have a similar architecture as of the resource's browser 302. In other embodiments (not shown), a server, e.g., the contact center server 110 of FIG. 1, may be located between the resource's device implementing the resource's browser 302 and the customer's device, e.g., the customer communication device 108 of FIG. 1, implementing the customer's browser 304.

Resources in contact centers are often required to put customers on hold or otherwise disengage from active communication with the customer in order to access information about the customer, to consult with a colleague, supervisor, or subject matter expert (SME), to perform research related to the customer's query, and the like. In addition, each resource in a contact center is frequently tasked with handling multiple, simultaneous interactions. One resource may simultaneously handle, for example, a phone call, multiple web chat sessions, and an email session, and the resource rotates between each customer interaction in an effort to progress toward resolution of the work item(s) associated with each interaction. Whenever the resource needs to disengage from active communication with the customer, the resource typically provides an initial reason to the customer for the interruption in communication (e.g., saying or typing, "I need to talk to my supervisor and get back to you"). However, any subsequent updates typically must be provided manually by the resource (e.g., saying or typing, "I talked to my supervisor but now I need to talk to do some research"). Customers who are on hold or otherwise experience periods of inactivity during an interaction may become frustrated with the perceived lack of progress, which may result in lower customer satisfaction, higher interaction abandonment rates, failure to meet applicable service level agreements, etc.

Systems and methods according to the present disclosure solve these problems by monitoring activities by a resource related to a customer interaction and automatically generating and transmitting periodic notifications comprising progress updates to the respective customer communication device(s) associated with each interaction. These notifications provide information to the customer regarding the actions being taken by the resource and serve to reassure each customer that the resource is working to address his or her individual query. The notifications may also result in a gain in productivity for the resource, as he or she is no longer required to manually update each individual customer regarding the actions being taken by the resource to resolve the customer's query. In particular, the presently disclosed systems and methods may allow an individual resource to concurrently handle more than one voice interaction.

With reference to FIGS. 1 and 2, the contact center server 110 comprises one or more event monitors 232 and a notification engine 234 that operate in conjunction with the other functionalities of the contact center server 110 and the contact center 102, such as the channel controller 230 and the work assignment/routing application 216, to accomplish these functions. As described herein, a contact object comprising one or more work items is assigned to a resource 112 of the contact center 102, and a connection is established between a customer communication device 108 and an associated resource communication device 112a via the customer communications channel 200, using known methods. The event monitor 232 detects the activities of the resource 112 related to the customer interaction between the resource 112 and the customer. The detected activities may comprise an interaction between the resource 112 and one or more additional resources associated with the contact center 102. The interaction with the one or more additional resources occurs over one or more communications channels (referred to herein collectively as a second communications channel) other than the customer communications channel 200 over which the resource 112 and the customer are communicating.

The second communications channel may include exchanges of data between different modules, or functionality blocks, of a single application operating, for example, on the resource communication device 112a, and/or intra-process or inter-process exchanges of data between different software applications (not shown) operating on the resource communication device 112a. In some examples, the resource communication device 112a may periodically transmit information regarding these exchanges of data to the event monitor 232. The second communications channel may also comprise one or more communications channels or networks within the contact center 102, e.g., the internal network 142, and/or one or more additional communications lines or channels 204a to 204y between the contact center 102 and one or more third-party resources (not separately labeled) that are external to the contact center 102. These third-party resources may include, for example, one or more persons, social media servers, web servers, external databases, and the like (not shown).

In some embodiments, the activities detected by the event monitor 232 may comprise interactions between the resource 112, e.g., a human agent, and one or more applications, such as a desktop application 248, on his or her resource communication device 112a. The event monitor 232 may detect when the resource 112 begins the customer interaction (e.g., by selecting a window or pane within the desktop application 238 corresponding to the customer interaction and answering the customer's phone call, sending an IM to the customer, opening the customer's email, etc.) and monitor the resource's activities while he or she is handling the customer interaction. For example, the resource 112 may switch windows/panes within the desktop application 248 (e.g., a change in focus state) in order to perform activities such as reviewing the customer's profile and contacting a colleague or supervisor. In other embodiments, the resource 112 may interact with other resources associated with the contact center 102 to perform activities such as searching the database 114 for information requested by the customer, selecting one or more additional applications (not shown) to access a website or external data source, contacting a person outside the contact center 102, etc. In further embodiments in which the customer is interacting with an automated resource 112, e.g., the IVR system 128, and the event monitor 232 may detect activities by the IVR system 128 related to the customer interaction. For example, the event monitor 232 may detect that the IVR system 128 has queried the database 114 for the customer's profile or has accessed a website or an external data source.

Upon detection of an activity by the resource 112 related to the customer interaction, the event monitor 232 may generate event data corresponding to the activity. This event data is forwarded to the notification engine 236, which may automatically generate a notification that includes an appropriate progress update related to the customer interaction. In some embodiments, the notification engine 236 generates the notification by executing a query of the notification database 214 and selecting an appropriate progress update based on the detected activity and corresponding event data. The notification database 214 may be a database as described in conjunction with FIG. 1, e.g., database(s) 114, and may include a variety of predefined progress updates that may be selected in response to receipt of event data corresponding to certain predetermined activities. The predefined progress updates may include, for example, text phrases or prerecorded audio messages. The predefined progress updates may be in one or more languages.

In one example, upon receipt of event data from the event monitor 232 indicating that the resource 112 is accessing information related to the customer (e.g., a customer profile, account information, medical history, purchase history, etc.), the notification engine 236 may select an appropriate predefined progress update from the notification database 214, such as "the agent is browsing your details." In another example, upon receipt of event data from the event monitor 232 indicating that the resource 112 is searching for information related to the customer's query (e.g., searching the database 114 for technical specifications for a product), the notification engine 236 may select a progress update such as "the agent is researching your query." In a further example, upon receipt of event data from the event monitor 232 indicating that the resource 112 has contacted a colleague or supervisor, the notification engine 236 may select a progress update such as "the agent is consulting with a colleague" or "the agent is consulting with a supervisor."

In other embodiments, those skilled in the art will recognize that the notification engine 236 may generate a progress update using a plurality of notification generation rules from a notification generation rules database (not shown) rather than selecting a predefined progress update from the notification database 214. The notification generation rules may be based on one or more algorithms, formulas, models, decision trees, and the like. For example, based on the notification generation rules, the notification engine 236 may generate a progress update of "the agent is browsing your details" upon receiving event data indicating that the resource 112 has executed a search of the database 114 that includes the customer's name.

It should be understood that the types of events detected by the event monitor 232 and/or the content of the notifications may be dependent, at least in part, on the type of business(es) serviced by the contact center 102, the content and context of the customer interaction, and the like. In one example, an event monitor in a contact center that services a retail business may be configured to detect activities related to sales transactions, returns, and refunds, and the notification database may include progress updates such as "the agent is confirming your purchase," "the agent is confirming your refund," and the like. In another example, an event monitor in a contact center that provides technical support for one or more products may be configured to detect activities related to remotely accessing a customer's device, and the notification database may include progress updates such as "the agent is accessing your computer," "the agent is installing an update on your computer," and the like. In a further example, a notification database associated with a contact center that services a medical center or a health insurance provider may include progress updates such as "the agent is consulting with a doctor," "the agent is accessing the billing system," and the like.

The notification comprising the progress update may then be transmitted, e.g., by the contact center server 110, via the customer communications channel 200 to the customer communication device 108 associated with the customer interaction. In some embodiments, the notification may be a same media type as the primary media type of the customer interaction. In one example, the customer interaction may comprise a voice call made with a standard telephone, which comprises one media type (voice). The notification may comprise the same media type (e.g., an audible progress update) and may be transmitted via the same voice communications channel over which the resource 112 and customer are communicating. The audible progress update may comprise a prerecorded message that is played to the customer via a speaker (not shown) associated with his or her customer communication device 108. Where the progress update is a text phrase retrieved from the notification database 214, the notification engine 236 may comprise a text-to-voice capability (not separately labeled) to convert the text phrase to an audible form with a computer simulated voice and vice versa. The notification engine 236 may also comprise a translation engine (not separately labeled) to translate the progress update from a first language, e.g., English, to a second language, e.g., Spanish.

In other embodiments, the customer interaction may comprise multiple media types, communications modes, and/or communications channels, and the notification may be transmitted as a media type or via a mode or channel that is different from a primary media type, mode, and/or channel of the customer interaction. For example, a customer interaction may be a text-based interaction occurring primarily via email, but notifications may be transmitted to the customer as SMS messages. For WebRTC interactions, which may involve real-time audio, video, and/or text communication, the primary media type of the customer interaction may be voice, but notifications may comprise text-based progress updates such as web chat messages. For video calls, which include a combination of image and voice media, the notification may comprise an audio notification and/or a visual (text) notification that is presented as an image on a display (not shown) of the customer communication device 108. In some examples, the customer may be prompted by the contact center 102 to receive notifications of a different media type and/or via a different communications mode or channel, e.g., a customer participating in a voice or video call may receive a prompt asking, "Would you like to receive updates via email?"

An optional notification filter 236 may be used to control one or more parameters relating to the content and transmission of notifications. The notification filter 236 may be provided with a plurality of filter rules from a filter rules database (not shown) that may be used to control, for example, the number, type, frequency, and/or content of the notifications. One or more of the filter rules may be created and applied based on one or more business rules of the contact center 102. The creation and application of the filter rules may also be controlled and customized based on one or more customer preferences, which may be stored in the customer profile. Preferences may be provided by the customer at the start of a present interaction and/or during one or more previous interactions. The filter rules may be used alone or in conjunction with one or more additional filter rules. One or more of the filter rules may comprise a weight that may be used to resolve application of conflicting rules, determine an order of application of the rules, etc.

The filter rules may comprise, for example, one or more rules that prevent transmission of notifications related to certain predetermined activities. For example, the filter rules may comprise a "Research Filter" that may be applied to prevent transmission of notifications related to a resource's research activities. The filter rules may also comprise a "Consultation Filter" that may be applied to prevent transmission of notifications related to resource's consultation activities, e.g., the resource 112 consults with a colleague, a supervisor, a SME, etc. Application of these filter rules may be based on the business rules of the contact center 102, e.g., certain customers are to be provided with more or less insight, and/or on customer preferences, e.g., the customer does not wish to be notified about certain activities.

The filter rules may also comprise a "Repeat Filter," in which transmission of a previous notification may be repeated in certain scenarios. For example, transmission of the previous notification (e.g., "the agent is researching your query") may be repeated when there is no new event data generated within a predefined time period, i.e., the resource 112 is having trouble finding information requested by the customer and is still performing research. In other examples, upon detecting one or more predetermined activities by the resource 112, a previous notification may be repeated rather than sending a notification related to the detected predetermined activity. For example, upon detecting that the resource 112 is performing research or has consulted a colleague, the Research Filter or the Consultation Filter may be applied to prevent transmission of notifications related to these activities, and the Repeat Filter may be applied to repeat transmission of a previous notification (e.g., "the agent is reviewing your details").

The filter rules may further comprise a "Grouping Filter," in which two or more notifications may be grouped into a single notification based on one or more parameters. In some examples, two or more notifications may be grouped and transmitted at predefined time intervals during a communications session, e.g., every 2 minutes. In other examples, two or more notifications may be grouped and transmitted as a single notification at the conclusion of the communications session. In further examples, two or more of the notifications generated within a specified time period, e.g., a 24-hour period, may be grouped into a single notification. In yet further examples, notifications may be grouped based on media type and/or communications mode. For example, notifications sent via email or text message may be grouped together to reduce the number of emails or text messages that are transmitted to the customer. In yet further examples, notifications relating to one topic or subject matter within the customer interaction, e.g., all notifications relating to a customer's request for a refund, may be grouped together.

The filter rules may further comprise a "Hold Filter" in which any notifications occurring during a predefined time interval are held and only the most recent notification is transmitted following expiration of the predefined time interval. For example, three new notifications (e.g., "the agent is reviewing your details"; "the agent is consulting with a supervisor"; and "your refund has been processed") may have accrued during the predefined time interval, e.g., 2 minutes, since a previous notification was sent. Rather than sending each notification as it is generated, the notifications may be held, and after 2 minutes, only the most recent notification (i.e., "your refund has been processed") may be transmitted to the customer communication device 108. The earlier two notifications that accrued during the predefined time interval may be skipped. If no new notifications have accrued (i.e., no new event data has been generated for 2 minutes), transmission of the previous notification may be repeated based on application of the Repeat Filter.

The filter rules may further comprise, for example, a "Media/Mode Filter," a "Format Filter," and the like that control and customize one or more parameters related to the content, format, and/or transmission of notifications. These rules may be used to control one or more of a media type and/or communications mode selected for the notification, a notification format (e.g., font and other appearance-related characteristics, language, etc.), the customer communication device(s) 108 to which the notification is to be transmitted, and the like. For example, a customer's profile may indicate a preference for receiving updates via text message sent to a particular customer communication device 108 associated with a phone number specified in the customer profile. In another example, application of one or more of the Media/Mode filter rules, the Format filter rules, and the like may be based, at least in part, on the customer communication device(s) 108 associated with the customer and the media capabilities of each device. The media capabilities of the customer communication device(s) 108 may be extracted during the present interaction, e.g., upon connection of the customer communication device(s) 108 with the contact center 102. The customer profile may also comprise historical information related to one or more customer communication devices 108 used by the customer in past interactions with the contact center 102 and the media capabilities of each device.

The filter rules may further comprise one or more rules based on one or more characteristics of the customer, which may be stored in the customer profile. For example, the business rules of the contact center 102 may include a "Priority Filter" that may be used to control the transmission of notifications to each customer based on a priority assigned to the customer. For example, "high" priority customers may receive different notifications (i.e., a larger variety of notifications, notifications at a higher frequency, etc.) than "low" priority customers. Notifications may also be customized for each customer based on other customer characteristics, such as demographics (e.g., age, education level, occupation, income, etc.), past behavior by the customer (e.g., a higher interaction abandonment rate, lower levels of customer satisfaction in surveys, etc.), and the like.

In some embodiments, the notification engine 236 may comprise a machine learning model, algorithm, or program (not separately labeled) that is capable of adjusting the notification generation rules and/or the filter rules and/or the application of these rules to customer interactions. Based on monitoring and analysis of one or more current and/or past customer interactions, the machine learning program may make alterations based on, for example, observed customer behavior, patterns, and habits, customer feedback, etc. The rules and/or their application may be adjusted for all customers or only for certain groups or types of customers. In some embodiments, the rules may be tailored to an individual customer. These alterations and adjustments by the machine learning program may be stored as preferences in the customer profile. In one example, in response to detecting an occurrence of one or more keywords indicating customer dissatisfaction, the machine learning program may make real-time alterations to one or more rules affecting generation and transmission of notifications (e.g., providing a greater number of progress updates and/or more detailed progress updates to reassure the customer that the agent is working to address his or her query). In another example, customers may be given the opportunity to provide feedback during or after the interaction, and the machine learning program may make alterations based on indications that customers are receiving too many notifications overall, too few of certain types of notifications, etc. In a further example, the machine learning may adjust the weight of one or more of the filter rules.

FIGS. 4A-4D, 5, and 6 illustrate exemplary methods in accordance with the present disclosure. These methods may be performed all or in part by a server of a contact center 102, e.g., the central contact center server 110, that is in communication with a memory device and executes instructions stored in the memory device. FIGS. 4A-4D, 5, and 6 are flowcharts illustrating an exemplary method for providing automated progress updates in accordance with the present disclosure.

Figure 4A:
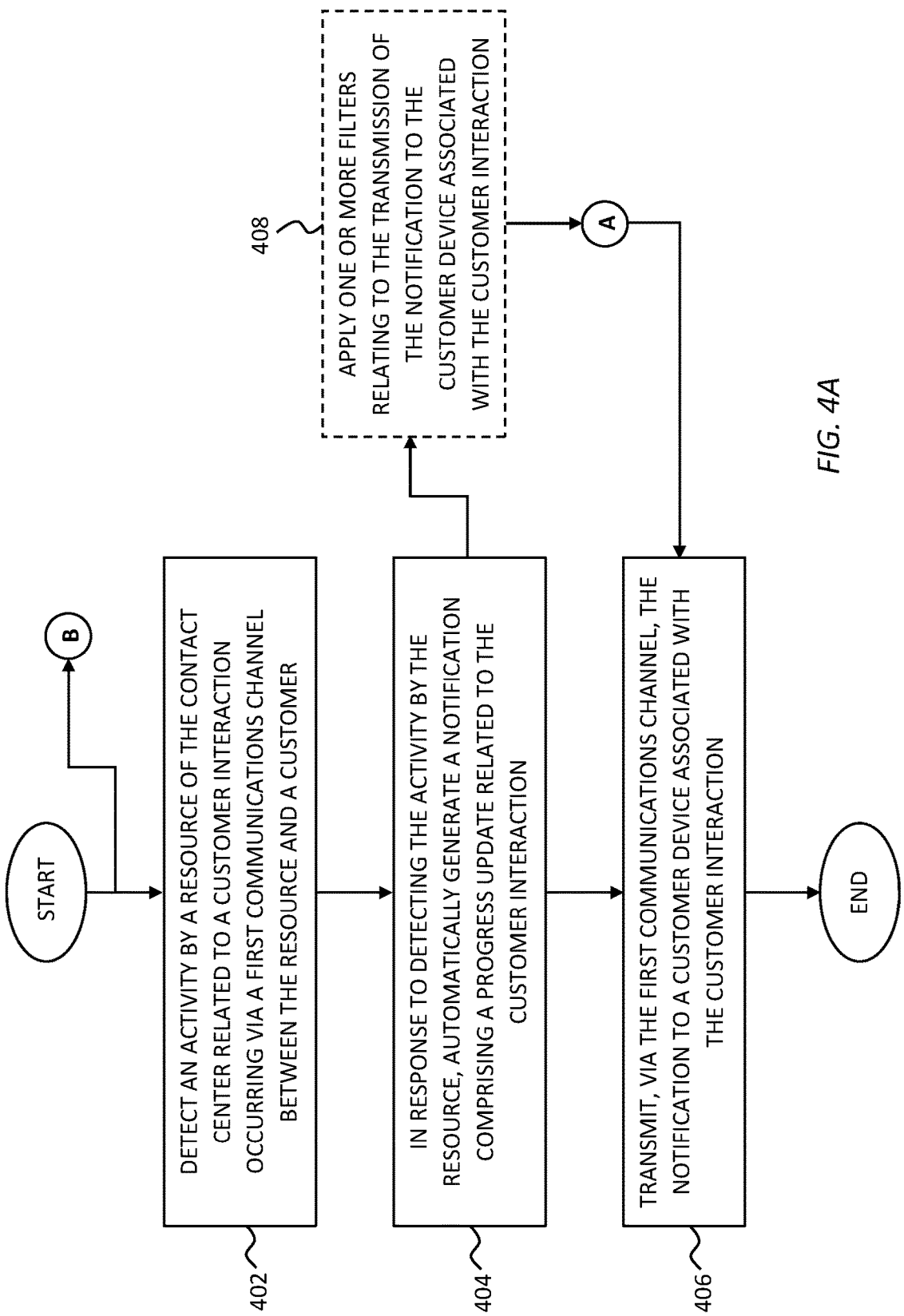

With reference to FIG. 4A, the method begins at Step 402 in which an activity by a resource of the contact center related to a customer interaction may be detected. The customer interaction may be occurring via a customer communications channel 200, between the resource and a customer. The detected activity may comprise an interaction between the resource and one or more additional resources associated with the contact center occurring via a second communications channel, e.g., the internal network 142 and/or the additional communications channel(s) 204 (see FIG. 2). At Step 404, in response to detecting the activity by the resource, a notification comprising a progress update related to the customer interaction may be automatically generated. At Step 406, the notification may be transmitted, via the customer communications channel, to a customer device associated with the customer interaction, after which the method may conclude.

In some embodiments, the customer interaction may comprise a primary media type (e.g., voice or data), and the notification may comprise a same media type as the primary media type. In other embodiments, the customer interaction may comprise a primary media type, (e.g., voice), and the notification may comprise a second, different media type (e.g., data). In one particular embodiment, the customer interaction may comprise a Web Real-Time Communication (WebRTC) call, in which the primary media type may be voice, and the notification may comprise a text-based progress update.

Prior to transmitting the notification to the customer device associated with the customer interaction in Step 406, the method of FIG. 4A may further comprise the optional application of one of more filters relating to the transmission of the notification to the customer device associated with the customer interaction in Step 408. FIGS. 4B-4D illustrate the steps following application of the one or more filters in Step 408. In one particular embodiment shown in FIG. 4B, based on the application of the one or more filters, a transmission of a previous notification to the customer device associated with the customer interaction may be repeated at Step 410 as described herein. In another particular embodiment depicted in FIG. 4C, a plurality of notifications related to the customer interaction may be automatically generated at Step 412, and based on the application of the one or more filters, two or more of the plurality of notifications may be grouped into a single notification at Step 414 as described herein. In a further particular embodiment shown in FIG. 4C, based on the application of the one or more filters, one or more of: (i) a notification media type, or (ii) a communications mode for transmitting the notification may be selected at Step 416 as described herein. Following the conclusion of the step(s) depicted in FIGS. 4B-4D, the method returns to Step 406 of FIG. 4A.

Figure 5:
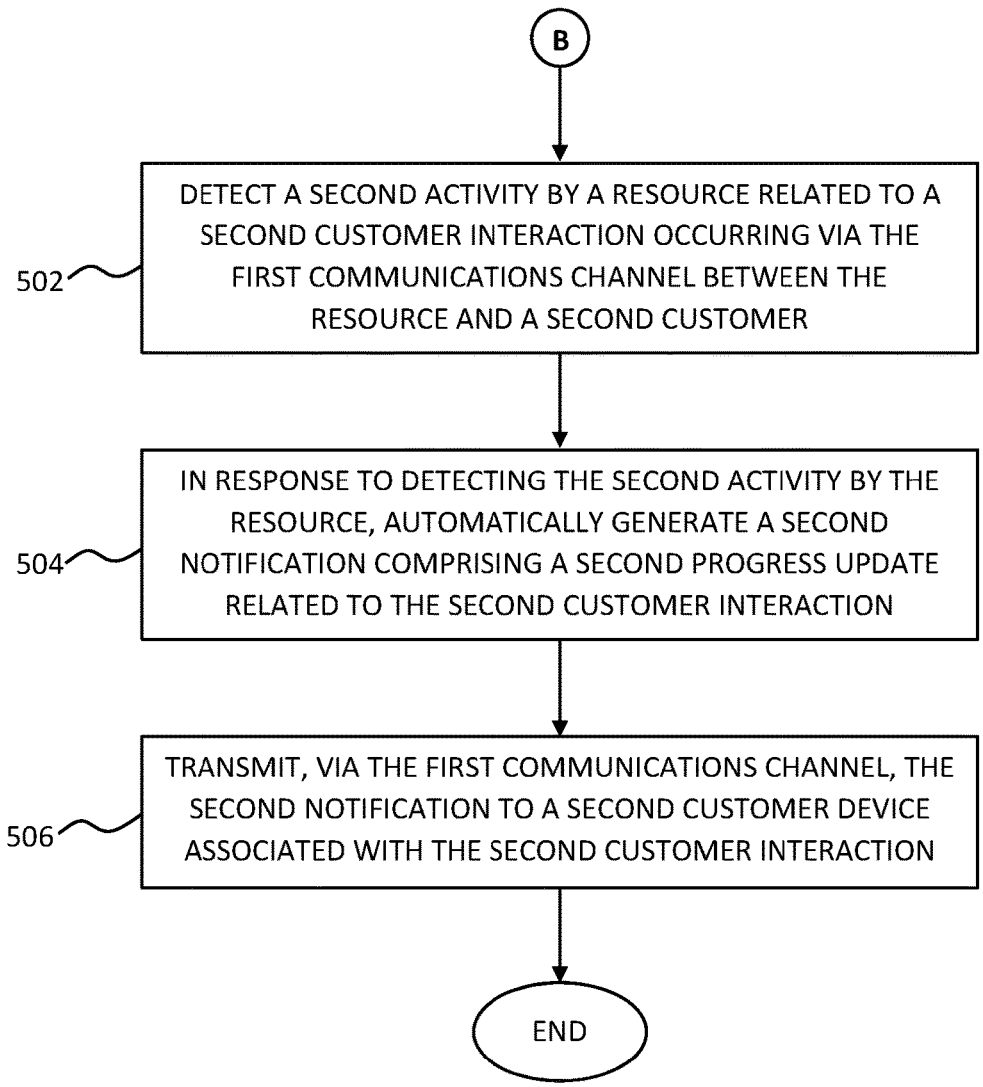
FIG. 5 is a flowchart of an exemplary method for providing automated progress updates in accordance with another aspect of the present disclosure.

FIG. 5 illustrates an exemplary method for providing automated progress updates that may be performed in parallel with the method depicted in FIG. 4A. At Step 502, an activity by the resource of the contact center related to a second customer interaction may be detected. The second customer interaction may be handled simultaneously by the resource and may be occurring via the customer communications channel between the resource and a second customer. The detected activity may comprise an interaction between the resource and one or more additional resources associated with the contact center occurring via the second communications channel, e.g., the internal network 142 and/or the additional communications channel(s) 204 (see FIG. 2). At Step 504, in response to detecting the second activity by the resource, a second notification comprising a second progress update related to the second customer interaction may be automatically generated. At Step 506, the second notification may be transmitted, via the customer communications channel, to a second customer device associated with the second customer interaction, after which the method may conclude.

In some embodiments, both customer interactions, e.g., the (first) customer interaction depicted in FIG. 4A and the second customer interaction depicted in FIG. 5, may comprise an audio interaction, and both progress updates may comprise an audible progress update.

Figure 6:
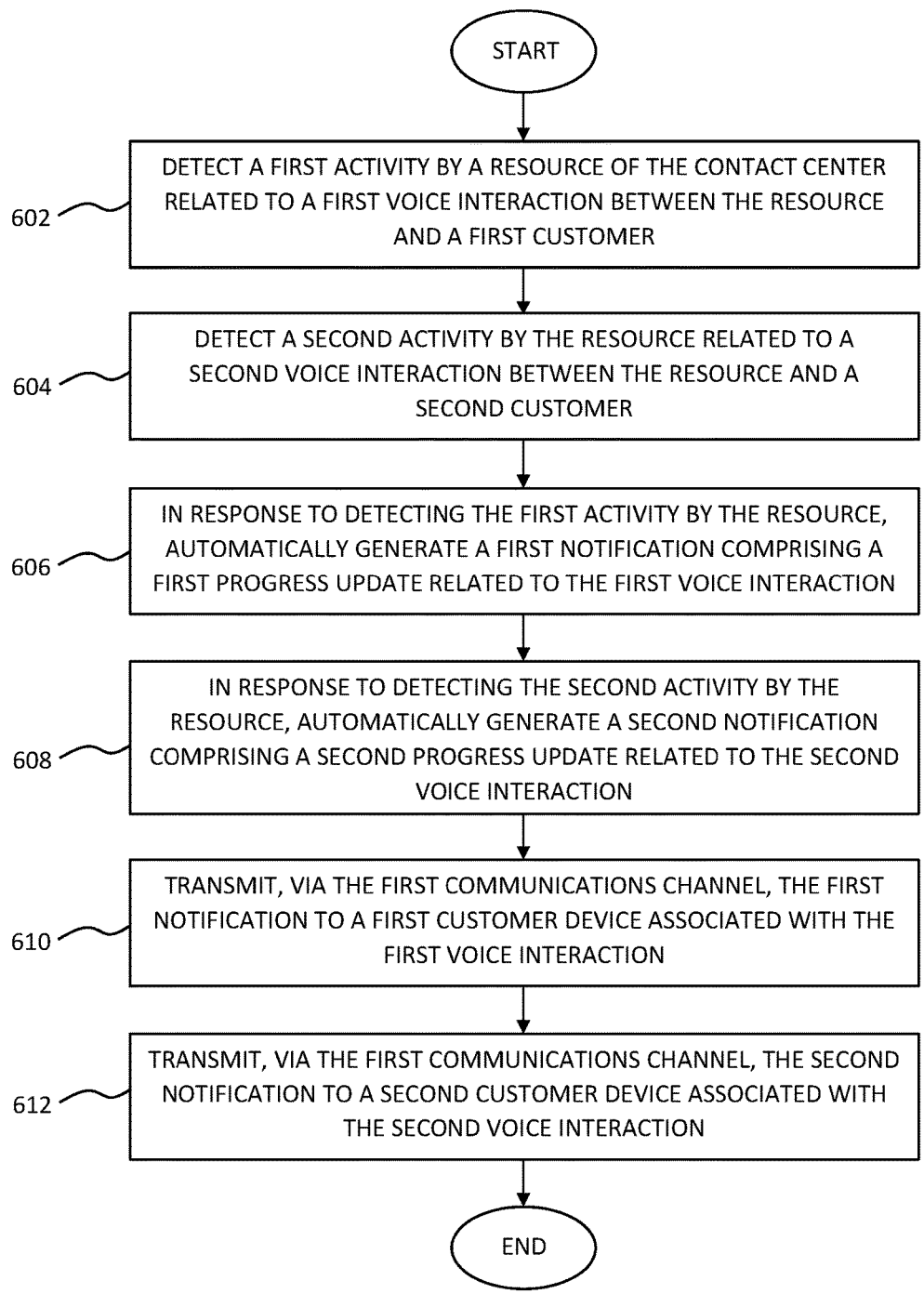
FIG. 6 is a flowchart of an exemplary method for providing automated progress updates in accordance with a further aspect of the present disclosure.

FIG. 6 illustrates another exemplary method for providing automated progress updates in accordance with the present disclosure. At Step 602, a first activity by a resource of the contact center related to a first voice interaction between the resource and a first customer may be detected. At step 604, a second activity by the resource related to a second voice interaction between the resource and a second customer is detected. The first and second voice interactions, which may be handled simultaneously by the resource, are both occurring via a customer communications channel between the resource and the first and second customers. The first and second activities by the resource may each comprise an interaction between the resource and one or more additional resources of the contact center occurring via a second communications channel, e.g., the internal network 142 and/or the additional communications channel(s) 204 (see FIG. 2).

At Step 606, in response to detecting the first activity by the resource, a first notification comprising a first progress update related to the first voice interaction may be automatically generated. At Step 608, in response to detecting the second activity by the resource, a second notification comprising a second progress update related to the second voice interaction may be automatically generated. The first and second progress updates may each comprise a respective audible progress update. At step 610, the first notification may be transmitted, via the customer communications channel, to a first customer device associated with the first voice interaction, and at step 612, the second notification may be transmitted, via the customer communications channel, to a second customer device associated with the second voice interaction, after which the method may conclude.

The presently disclosed system and method may be more fully understood by way of the following examples.

EXAMPLE 1

A customer needs to renew his home insurance policy. Using his standard home telephone, he calls a contact center 102 that handles inquiries for his insurance company. The customer's call is assigned to an agent, who receives an indication (e.g., a new work card) on her desktop application 238 corresponding to the interaction with the customer. The agent selects the work card, which causes multiple new windows (also referred to as productivity tools) to appear on her desktop. These productivity tools may include, for example, a customer profile window with customer information (e.g., name, policy number, preferred language, a link to his interaction history, etc.), a window listing other agents in her department, a window listing available supervisors, a window listing agents in sales, etc.

In response to detecting the agent's selection of the work card, the event monitor 232 begins tracking her activities related to the customer interaction. When the agent answers the customer's call, she verifies his identity and determines the purpose of his call. The customer asks the agent if she can match a quote from a competitor for $200.00 less than his current rate. The customer also asks the agent if she has a brochure about flood insurance that she can mail to him. The agent tells the customer that she needs to put him on hold. In her desktop application 238, the agent selects the customer profile window to review the customer's current rates, how long he has been a customer, etc. In response to detecting the agent's selection of the customer profile window, the event monitor 232 generates corresponding event data, which is transmitted to the notification engine 234. The notification engine 234 generates a notification by selecting an appropriate progress update from the notification database 214 (e.g., a brief recording stating, "the agent is reviewing the details of your policy"). The notification is transmitted to the customer, e.g., by playing the audio recording over the speaker on the customer's telephone.

The agent is a newer employee and wishes to confer with a colleague about the customer's request for a reduced premium. She clicks on the window containing the listing of other agents in her department and selects an agent who has experience with policy renewals, which triggers, for example, an IM session with the selected agent. The event tracker 232 generates event data upon detecting that the agent has clicked on the agent listing window and is interacting with the other agent. The notification engine 234 selects a progress update (e.g., a brief recording stating, "the agent is conferring with a colleague"), and the notification is transmitted to the customer. The agent's colleague tells her that the customer's request requires supervisor approval, so she selects another window that contains a list of supervisors. The event tracker 232 generates event data, the notification engine 234 selects a progress update (e.g., a brief recording stating, "the agent is conferring with a supervisor"), and the notification is transmitted to the customer. While waiting for supervisor approval, the agent may query the database 114 and/or open a new web browser window to search for the brochure requested by the customer. Upon detecting this activity, the event tracker 232 generates event data, and the notification engine 234 selects a progress update (e.g., a brief recording stating, "the agent is researching your brochure request") that is played to the customer.

Without these notifications, the customer would have been on hold during all of these events, and unless the agent had manually informed him of the actions taken at each stage, he would have no indication that any progress had been made on his request. The agent resumes the phone call with the customer and informs him that she has obtained authorization to renew his policy at the requested lower rate and that she has initiated the policy renewal process. During the call, the customer's policy is successfully renewed, which may result in a progress update (e.g., a brief recording stating, "your policy has been renewed") being selected and played to the customer while he is talking to the agent.

In the above example, much of the interaction between the customer and the agent may be replaced by, or supplemented with, interaction between the customer and an automated resource of the contact center 102, e.g., an IVR system 128. For example, before being connected to the agent, the customer may first interact with the IVR system 128 to provide the general purpose for his call (i.e., policy renewal). Upon detecting that the IVR system 128 is querying the database 114 for the customer's profile, the event tracker 232 generates event data, the notification engine 234 selects a progress update (e.g., "I am reviewing the details of your policy"), and a notification is transmitted to the customer. The IVR system 128 may also perform research such as querying the database 114 for the brochure about flood insurance, and a notification comprising a progress update (e.g., "I am researching your request") may be transmitted to the customer.

EXAMPLE 2

In the above example, the agent may be tasked with simultaneously handling interactions with multiple customers, including multiple text- and/or voice-based interactions. For example, during her interaction with the first customer, the agent may receive a new work card indicating that a second customer interaction has been assigned to her. The second customer interaction may comprise one or more of a web chat, an email session, a telephone call, etc., as described herein. The agent may begin interacting with the second customer, for example, while she is consulting with her colleague or supervisor and/or while she is searching for the information requested by the first customer. Because the event monitor 232 and notification engine 234 operate together to detect the agent's activities related to the interaction with the first customer and automatically select and transmit appropriate notifications, the agent does not need to manually inform the first customer of her actions at each stage, and the first customer is assured that his request is being addressed. The event monitor 232 and notification engine 234 may also provide progress updates to the second customer in the same manner as described above.

The flowchart and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). In addition, while the flowcharts have been discussed and illustrated in relation to a particular sequence of events, it should be appreciated that changes, additions, and omissions to this sequence may occur without materially affecting the operation of the disclosure. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, microcode, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that may contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as JAVA, SCALA, SMALLTALK, EIFFEL, JADE, EMERALD, C++, CII, VB.NET, PYTHON or the like, conventional procedural programming languages, such as the "c" programming language, VISUAL BASIC, FORTRAN 2003, PERL, COBOL 2002, PHP, ABAP, dynamic programming languages such as PYTHON, RUBY, and GROOVY, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks. Alternatively, a symmetric multiprocessor (SMP) system or other configuration including a plurality of processors may be used.

These computer program instructions may also be stored in a computer readable medium that when executed may direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions that execute on the computer or other programmable apparatus provide processes for implementing the functions/acts specified in the flowchart and/or block diagram block or blocks.

While the exemplary embodiments illustrated herein show the various components of the system collocated, certain components of the system may be located remotely, at distant portions of a distributed network, such as a LAN and/or the Internet, or within a dedicated system. Thus, it should be appreciated, that the components of the system may be combined in to one or more devices, such as a switch, server, and/or adjunct, or collocated on a particular node of a distributed network, such as an analog and/or digital telecommunications network, a packet-switch network, or a circuit-switched network. It will be appreciated from the preceding description, and for reasons of computational efficiency, that the components of the system may be arranged at any location within a distributed network of components without affecting the operation of the system. For example, the various components may be located in a switch such as a PBX and media server, gateway, in one or more communication devices, at one or more users' premises, or some combination thereof. Similarly, one or more functional portions of the system could be distributed between a telecommunication device(s) and an associated computing device.

Furthermore, it should be appreciated that the various links connecting the elements may be wired or wireless links, or any combination thereof, or any other known or later developed element(s) that is capable of supplying and/or communicating data to and from the connected elements. These wired or wireless links may also be secure links and may be capable of communicating encrypted information. Transmission media used as links, for example, may be any suitable carrier for electrical signals, including coaxial cables, copper wire, and fiber optics, and may take the form of acoustic or light waves, such as those generated during radio-wave and infra-red data communications.

A number of variations and modifications of the disclosure may be used. It would be possible to provide for some features of the disclosure without providing others. For example, in one alternative embodiment, the systems and methods of this disclosure may be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein may be used to implement the various aspects of this disclosure. Exemplary hardware that may be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing may also be constructed to implement the methods described herein.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

While the foregoing is directed to embodiments of the present disclosure, other and further embodiments of the present disclosure may be devised without departing from the basic scope thereof. It is understood that various embodiments described herein may be utilized in combination with any other embodiment described, without departing from the scope contained herein. Further, the foregoing description is not intended to be exhaustive or to limit the present disclosure to the precise form disclosed. Modifications and variations are possible in light of the above teachings or may be acquired from practice of the present disclosure.

What is claimed is:

1. A method for providing automated progress updates, the method comprising:

detecting, by a processor of a contact center, an activity by a resource of the contact center related to a customer interaction, wherein the customer interaction is occurring via a customer communications channel between the resource and a customer and wherein the activity comprises an interaction between the resource and one or more additional resources associated with the contact center occurring via a second communications channel;

in response to detecting the activity by the resource that is occurring via the second communications channel, automatically generating, by the processor, based on the activity, a notification comprising a progress update related to the customer interaction, wherein automatically generating the notification comprises one of selecting a predefined progress update from a notification database or generating the progress update using one or more notification generation rules; and transmitting, by the processor, via the customer communications channel, the notification to a customer device associated with the customer interaction.

2. The method of claim 1, wherein:
the customer interaction comprises a primary media type; and
the notification comprises a same media type as the primary media type.

3. The method of claim 1, wherein:
the customer interaction comprises a primary media type; and
the notification comprises a second, different media type.

4. The system of claim 3, wherein:
the customer interaction comprises a Web Real-Time Communication (WebRTC) call, the primary media type being voice; and
the notification comprises a text-based progress update.

5. The method of claim 1, further comprising:
applying, by the processor, one or more filters relating to the transmission of the notification to the customer device associated with the customer interaction,
wherein transmitting the notification comprises repeating, based on the application of the one or more filters, a transmission of a previous notification to the customer device associated with the customer interaction.

6. The method of claim 1, further comprising:
applying, by the processor, one or more filters relating to the transmission of the notification to the customer device associated with the customer interaction; and
automatically generating, by the processor, a plurality of notifications related to the customer interaction,
wherein transmitting the notification comprises grouping, based on the application of the one or more filters, two or more of the plurality of notifications into a single notification.

7. The method of claim 1, further comprising:
applying, by the processor, one or more filters relating to the transmission of the notification to the customer device associated with the customer interaction; and
selecting, by the processor, based on the application of the one or more filters, at least one of:
(i) a notification media type of the notification transmitted to the customer device; or
(ii) a communications mode for transmitting the notification.

8. The method of claim 1, further comprising:
detecting, by the processor, a second activity by the resource related to a second customer interaction, wherein the second customer interaction is occurring via the customer communications channel between the resource and a second customer, the second customer interaction is handled simultaneously by the resource, and the second activity comprises an interaction between the resource and the one or more additional resources occurring via the second communications channel;
in response to detecting the second activity by the resource that is occurring via the second communications channel, automatically generating, by the processor, based on the second activity, a second notification comprising a second progress update related to the second customer interaction, wherein automatically generating the second notification comprises one of selecting a predefined progress update from the notification database or generating the second progress update using one or more notification generation rules; and
transmitting, by the processor, via the customer communications channel, the second notification to a second customer device associated with the second customer interaction.

9. The method of claim 8, wherein:
both customer interactions comprise an audio interaction; and
both progress updates comprise an audible progress update.

10. The method of claim 1, wherein the progress update is generated using the one or more notification generation rules, the method further comprising:
monitoring, by the processor, a content of the customer interaction; and
based on the content of the customer interaction, altering, by the processor in real-time, at least one of the notification generation rules.

11. A system for providing automated progress updates, the system comprising:
a memory device, storing executable instructions; and
a processor in communication with the memory device, wherein the processor when executing the executable instructions:
detects an activity by a resource of a contact center related to a customer interaction, wherein the customer interaction is occurring via a customer communications channel between the resource and a customer and wherein the activity comprises an interaction between the resource and one or more additional resources associated with the contact center occurring via a second communications channel;
in response to detecting the activity by the resource that is occurring via the second communications channel, automatically generates, based on the activity, a notification comprising a progress update related to the customer interaction, wherein automatically generating the notification comprises one of selecting a predefined progress update from a notification database or generating the progress update using one or more notification generation rules; and
transmits, via the customer communications channel, the notification to a customer device associated with the customer interaction.

12. The system of claim 11, wherein:
the customer interaction comprises a primary media type; and
the notification comprises a same media type as the primary media type.

13. The system of claim 11, wherein:
the customer interaction comprises a primary media type; and
the notification comprises a second, different media type.

14. The system of claim 13, wherein:
the customer interaction comprises a Web Real-Time Communication (WebRTC) call, the primary media type being voice; and
the notification comprises a text-based progress update.

15. The system of claim 11, wherein the processor when executing the executable instructions:

applies one or more filters relating to the transmission of the notification to the customer device associated with the customer interaction,
wherein transmitting the notification comprises repeating, based on the application of the one or more filters, a transmission of a previous notification to the customer device associated with the customer interaction.

16. The system of claim 11, wherein the processor when executing the executable instructions:
applies one or more filters relating to the transmission of the notification to the customer device associated with the customer interaction; and
automatically generates a plurality of notifications related to the customer interaction,
wherein transmitting the notification comprises grouping, based on the application of the one or more filters, two or more of the plurality of notifications into a single notification.

17. The system of claim 11, wherein the processor when executing the executable instructions:
applies one or more filters relating to the transmission of the notification to the customer device associated with the customer interaction; and
selects, based on the application of the one or more filters, at least one of:
(i) a notification media type of the notification transmitted to the customer device; or
(ii) a communications mode for transmitting the notification.

18. The system of claim 11, wherein the processor when executing the executable instructions:
detects a second activity by the resource related to a second customer interaction, wherein the second customer interaction is occurring via the customer communications channel between the resource and a second customer, the second customer interaction is handled simultaneously by the resource, and the second activity comprises an interaction between the resource and the one or more additional resources occurring via the second communications channel;
in response to detecting the second activity by the resource that is occurring via the second communications channel, automatically generates, based on the second activity, a second notification comprising a second progress update related to the second customer interaction, wherein automatically generating the second notification comprises one of selecting a predefined progress update from the notification database or generating the second progress update using one or more notification generation rules; and
transmits, via the customer communications channel, the second notification to a second customer device associated with the second customer interaction.

19. The system of claim 18, wherein:
both customer interactions comprise an audio interaction; and
both progress updates comprise an audible progress update.

20. A method for providing automated progress updates, the method comprising:
detecting, by a processor of a contact center, a first activity by a resource of the contact center related to a first voice interaction between the resource and a first customer;
detecting, by the processor, a second activity by the resource related to a second voice interaction between the resource and a second customer, wherein:
the first and second voice interactions are handled simultaneously by the resource and are occurring via a customer communications channel between the resource and the first and second customers; and
the first and second activities each comprise an interaction between the resource and one or more additional resources associated with the contact center occurring via a second communications channel;
in response to detecting the first activity by the resource that is occurring via the second communications channel, automatically generating, by the processor, based on the first activity, a first notification comprising a first progress update related to the first voice interaction;
in response to detecting the second activity by the resource that is occurring via the second communications channel, automatically generating, by the processor, based on the first activity, a second notification comprising a second progress update related to the second voice interaction, wherein the first and second progress updates each comprise a respective audible progress update;
transmitting, by the processor, via the customer communications channel, the first notification to a first customer device associated with the first voice interaction; and
transmitting, by the processor, via the customer communications channel, the second notification to a second customer device associated with the second voice interaction,
wherein at least one of the first or the second voice interaction is on hold during and after transmission of a respective one of the first and second notifications.

* * * * *